UNITED STATES PATENT OFFICE.

JABEZ TURTON, OF LONDON, ENGLAND.

PROCESS OF EXTRACTION OF METAL FROM ORES.

SPECIFICATION forming part of Letters Patent No. 494,044, dated March 21, 1893.

Application filed April 6, 1892. Serial No. 428,072. (No specimens.)

*To all whom it may concern:*

Be it known that I, JABEZ TURTON, a subject of the Queen of England, residing at No. 9 Norfolk Street, Strand, London, England, have invented a new and useful Process of Extraction of Metals from Ores, of which the following is a specification.

My invention relates to the treatment of ores and minerals containing metals in such a manner as to separate the metals, particularly precious metals from them. For this purpose, I reduce the ore or mineral to a fine powder, or I roast and crush it and then subject it to the action of a strong solution in water of nitrate of potash or of soda, common salt and sulphuric acid whereby the metals are dissolved. The proportions of the ingredients of the solution may be varied. Practically, I find a good proportion to be about one part by weight of nitrate, two parts of salt and four parts of sulphuric acid. After the metals are dissolved I separate the solution from the earthy matter and apply to the solution zinc or other precipitant, whereby many of the metals, including gold if it is present, are precipitated in the form of a powder which can be treated in any known manner for separation and fusion of the metals. If there be silver in the mineral, it will be found in the residue after separating the solution, in the form of chloride, which may be treated in any known manner for separation of the silver.

I am aware that in extracting metals it has been proposed to employ a mixture of nitrate of soda, chloride of sodium and alum; but this does not constitute my invention and is not claimed by me.

Having thus described the nature of my invention and in what manner the same is to be performed, I claim—

The process herein described for the extraction of metals from ores and minerals, which consists in subjecting the ore or mineral to the action of a nitrate of an alkali metal such as nitrate of potash, chloride of sodium and sulphuric acid for solution of the contained metals, then separating the earthy matters and precipitating the metal from the solution, substantially as set forth.

In testimony whereof I have signed my name to this specification, in the presence of two subscribing witnesses, this 24th day of March, A. D. 1892.

JABEZ TURTON.

Witnesses:
OLIVER IMRAY,
*Chartered Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*